Oct. 17, 1933.   S. MINIERE   1,930,841
RECEPTACLE
Filed May 3, 1932
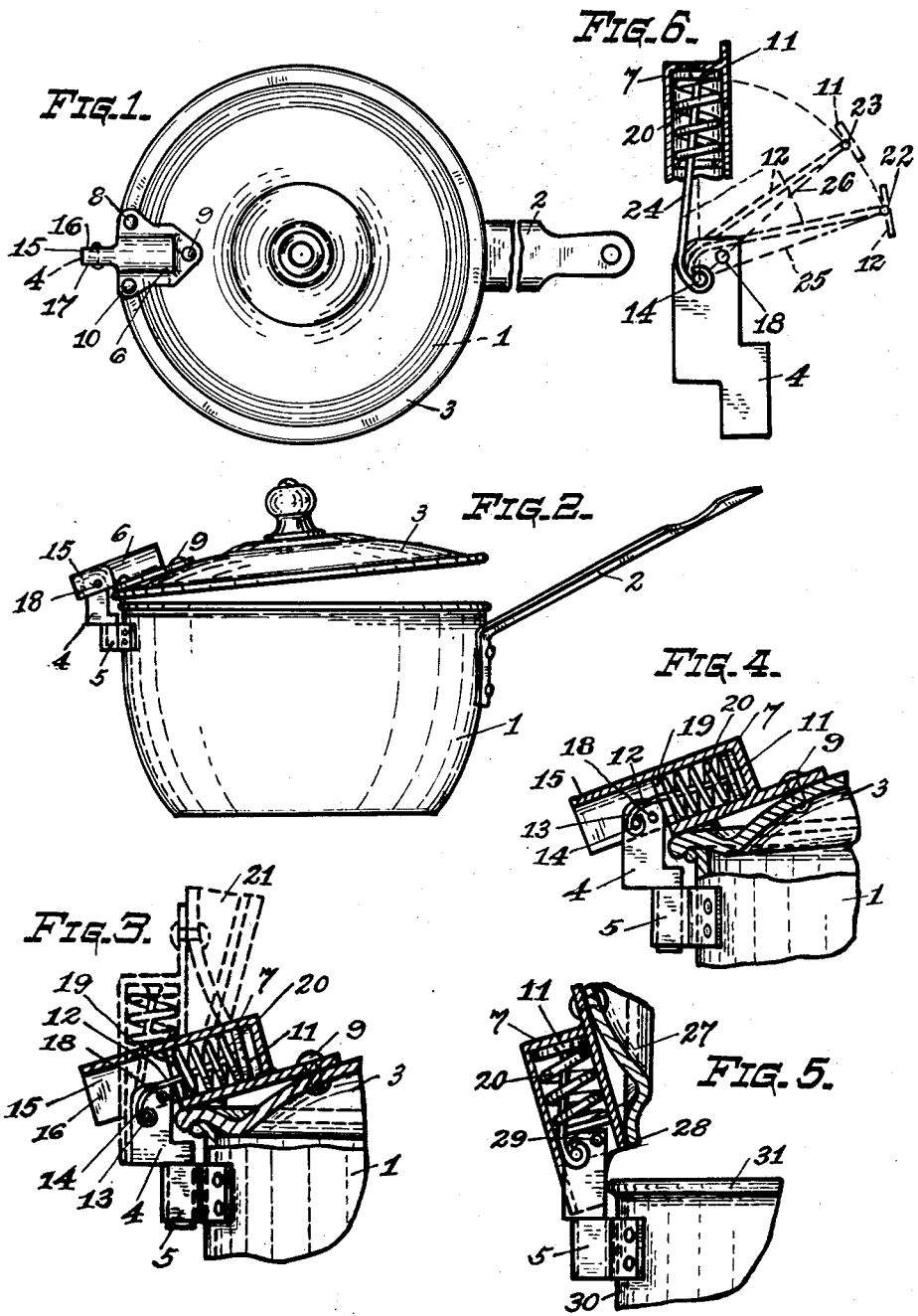

Patented Oct. 17, 1933

1,930,841

UNITED STATES PATENT OFFICE 1,930,841

RECEPTACLE

Salvatore Miniere, Pittsburgh, Pa.

Application May 3, 1932. Serial No. 609,019

3 Claims. (Cl. 53—8)

The present invention relates to receptacles, of the type used for cooking purposes, which have a lid which is automatically liftable, and also has automatic means for holding the lid in a number of partially opened positions. The lid is also readily detached from the receptacle. As will be further seen as the description proceeds herein, the automatic means which holds the lid in partially opened position, is adapted upon slight manipulation to raise the lid to its highest or open position, and also to hold the lid in a closed position on the receptacle.

Heretofore in this art mechanical means has been provided to hold the lid of a receptacle in closed position, when vegetables or other foods are being cooked therein, said means holding the lid down against the action of the steam produced in the receptacle. Also mechanical means have been provided for holding the lid of a receptacle in partially opened position so that the steam may escape from the receptacle. For an example of a receptacle having the features just described, reference is made to U. S. Patent No. 1,714,394 for Receptacles by the present inventor, dated May 21, 1929. The means used for accomplishing these purposes in the present invention will be found to be a distinct improvement in the art, automatically operating to occupy any of the positions just described automatically, upon slight manipulation.

In the present invention, means is also provided whereby when the lid of the receptacle is opened, any dripping precipitated water which collects on the lid, is directed back into the receptacle itself. All the above features will be more fully described in the present specification.

In the accompanying drawing forming part of the present specification, I have shown a complete example of my invention, and a modification thereof.

Figure 1 is a plan view of a receptacle illustrating my invention.

Figure 2 is a side view of the receptacle shown in Figure 1.

Figure 3 is an enlarged longitudinal central vertical section, of the lid-lifting means shown in Figures 1 and 2, with the lid in closed position on the receptacle.

Figure 4 is a similar section to Figure 3 with the lid in partly open position.

Figure 5 shows a similar view to Figures 3 and 4, of a slightly modified form of the invention.

Figure 6 is a diagrammatic view illustrating the plunger in various positions, as used in my invention.

In the drawing, the numeral 1 indicates an ordinary pot or kitchen receptacle, usually of aluminum or other suitable metal provided with the usual handle 2, and a lid or cover 3, the latter being preferably detachably mounted by means of the vertical support 4 which carries the lid, being slidably mounted in the supporting bracket 5.

The automatic lifting means for the lid and the means for holding the cover in a plurality of positions in the present invention are arranged in a single device 6 and therein lies one of the important features of the present invention. The lifting and holding means 6 comprises the following parts. An enclosing cylinder 7 is rigidly mounted on the lid 3 by any suitable means, such as the rivets 8, 9, 10. Within the cylinder 7 reciprocally operates the piston head 11, connected to which is the piston or plunger stem 12, the latter being provided with a curved end 13, which is pivotally attached to the vertical support 4 at point 14. The cylinder 7 is provided with an extension 15, which has flattened vertical sides 16, 17 in which the vertical support 4 operates when the lid is lifted. This cylinder 7 is pivotally mounted on a transverse pintle 18, which in turn is mounted on the support 4, so that the lid or cover of the receptacle 3 is hingedly mounted on the body of the receptacle 1, by means of the bracket 5, the support 4, and the pintle 18. Within the cylinder 7 is a perforated transverse partition wall 19, through which the plunger stem 12 reciprocates, the wall 19 being rigidly fixed within the cylinder 7. The spring 20 surrounds the stem 12, and engages against the piston head 11 on one end thereof, and against the partition wall 19 on its opposite end. When the lid 3 is in opened position as shown at 21, Figure 3, the spring 20 is in fully expanded position, while when the lid is lowered the spring becomes compressed, as is at once understood from said Figure 3, the spring always tending to expand and lift the lid to fully opened position. It is evident that when the lid 3 is lifted from closed to open position the piston head 11, and the spring 20 slide along the interior of the cylinder 7, due to the expanding action of said spring.

The action of the present device may best be explained from a diagram shown in Figure 6 of the drawing, in which several positions of the plunger stem 12 are shown; 22 being its position when the lid 3 is fully closed on the receptacle 1, and shown in full lines in Figure 3; 23 illustrating the position of the stem when the lid is partially opened as shown in Figures 2 and 4; and 24 indicating the stem when the cover is fully opened as at 21 in Figure 3 of the drawing.

When the lid is fully closed the lid 3 will remain closed by its own action once it is manually placed in said position, as will be explained; when the lid is raised to a desired point such as that shown when the stem is at 23, the cover will remain suspended in partially open position, this point being a selective one; and when the lid passes this selected point of elevation, any further upward movement of said lid, will cause same to at once rise, due to the further action of the spring 20, to fully opened position illustrated by the position of the stem at 24.

In further explanation of the above features, it is seen from Figure 6 that when the stem 12 is in a position indicated at 22, the action of the spring 20 against the piston-head 11 creates a line of action in the stem 12 along the dotted line 25. When this line of action of the force acting against the piston head 11 is below the pintle 18 which is the fulcrum point for the cover 3, the stem 12, the spring 20 and associated parts are in a locked position as can be seen from Figure 3 of the drawing, in which case the spring 20 fails to lift the lid because it is jammed in such a position that it cannot act. In addition to this locking feature the turning moment of the centre of gravity of the cover about the pintle 18 in a clockwise direction as seen in Figure 6, tends to securely hold the cover in its lowest position on the receptacle, said position corresponding to the position 22 of the stem 12.

When the lid is raised manually to a point at which the stem 12 is at 23, it is seen that the line of action of the spring 20 and the piston-head 11 is represented by the dotted line 26, in which case said line of action passes through the fulcrum point at the pintle 18. Disregarding the turning moment of the cover about pintle 18, it is seen that the position of the cover 3 corresponding to this location of the stem is the theoretical point at which the spring 20 is locked in its descent from fully open position, so that the lifting effect of the spring is neutralized at this point, and due to friction in the moving parts of the device, the cover will remain in any manually placed position between the points 23 and 22 just described. However, the slightest manual movement upward of the cover 3, from point 23, will cause the spring 20 to immediately raise the cover to its uppermost position. The turning effect of the weight of the cover about the pintle 18 changes the neutralized position of the piston-head 11 slightly from that shown in position 23, but nevertheless it remains substantially thereabout.

From the above description, it is seen that the cover 3 will remain in fully closed position, or in the position corresponding to 23 and well illustrated in Figure 2 of the drawing, if manually placed in either position, and in any desired position between points 22 and 23. The purpose of this arrangement of parts is to permit the lid 3 to be held automatically in partially opened position, and allow the steam to escape when vegetables and similar foods are cooked in the receptacle 1.

In Figure 5, I have shown a modified form of cover, and mounting, in which the steam drippings collected by the cover will drain within the internal diameter of the receptacle, as is easily seen in Figure 5. This arrangement of parts is merely one of selection of a cover 27, having a shortened diametrical edge 28, and a proper relative position of the pintle point 29, with reference to the side wall 30 of the receptacle 31, as is at once understood.

The use of the present invention eliminates the use of accessory devices for holding the lid open, the lifting and holding devices for the cover being united in a single type of operating mechanism, like that described herein. From which it is seen I have provided by the present invention a very useful, and automatically operating device of the kind under consideration.

I claim:

1. In a receptacle, an automatically liftable lid, automatic means for holding the lid in a closed, and in selective partially open positions, comprising a cylinder mounted on the lid, a perforated transverse partition wall in the cylinder, a spring-piston in engagement with said partition wall slidably operating within the cylinder, a vertical support for the cylinder, mounted on the receptacle and pivotally connected to said cylinder, a bent piston stem pivotally attached to the vertical support at a point therein of lower elevation than the first named pivot connection, for the purpose of providing a locking action on the spring piston, when the lid is lowered to a selective point of elevation, where the lid is automatically held in a partially opened position.

2. In a receptacle, a detachable automatically liftable lid, spring actuated means for automatically holding the lid in a plurality of closed, and partially opened positions, comprising a detachably mounted vertical support on the receptacle, a cylinder on the lid pivotally mounted on the vertical support, a perforated transverse partition wall in the cylinder, a spring-piston in engagement with said partition wall and adapted to slidably operate within the cylinder, a bent piston stem pivotally attached to the vertical support at a point of lower elevation than the first named pivotal point of the same, for the purpose of causing a locking action on the spring-piston when the lid is lowered to a predetermined point of elevation, providing a plurality of partially opened positions, and a closed position, at which the lid may be automatically held in a selected position.

3. In a receptacle, an automatically liftable lid, a cylinder rigidly mounted on the lid, an extension on said cylinder, having a pair of opposed flattened vertical side pieces thereon, a circular spring slidably mounted within the cylinder, a transverse partition wall in the cylinder, forming an abutment for said circular spring, a supporting bracket mounted on the body of the receptacle, a vertical support detachably and slidably mounted in the supporting bracket, a pintle in said vertical support, on which said cylinder extension is revolvably mounted, and automatic means for preventing the circular spring from moving the cover when the latter is in a number of selective positions, comprising a bent piston stem, having a head in engagement with the circular spring, and pivotally mounted in the vertical support at a point lower than the pintle on which the cylinder extension is mounted.

SALVATORE MINIERE.